Sept. 15, 1931. L. KOZLOWSKI 1,823,365
INSECT TRAP
Filed July 1, 1929
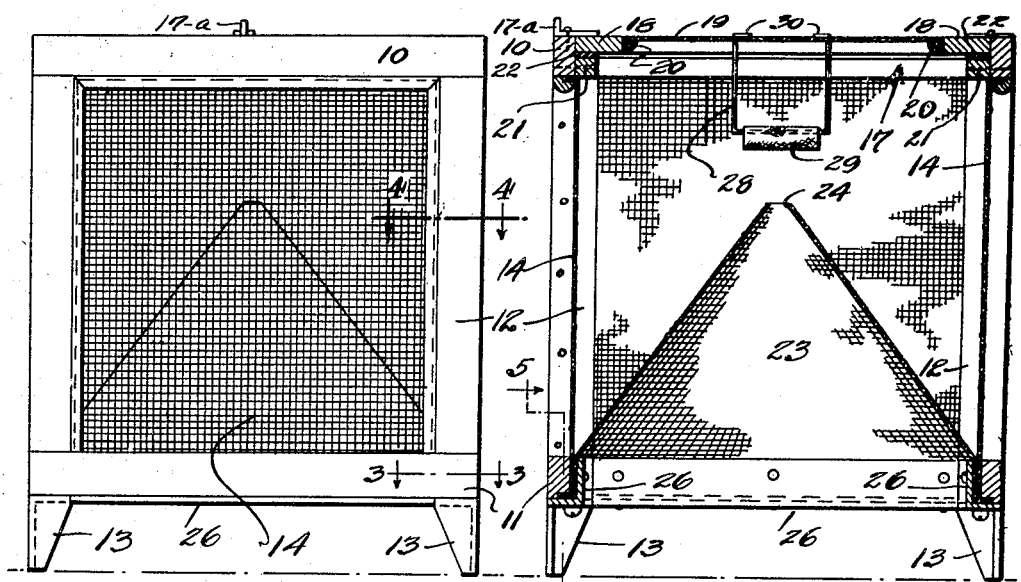
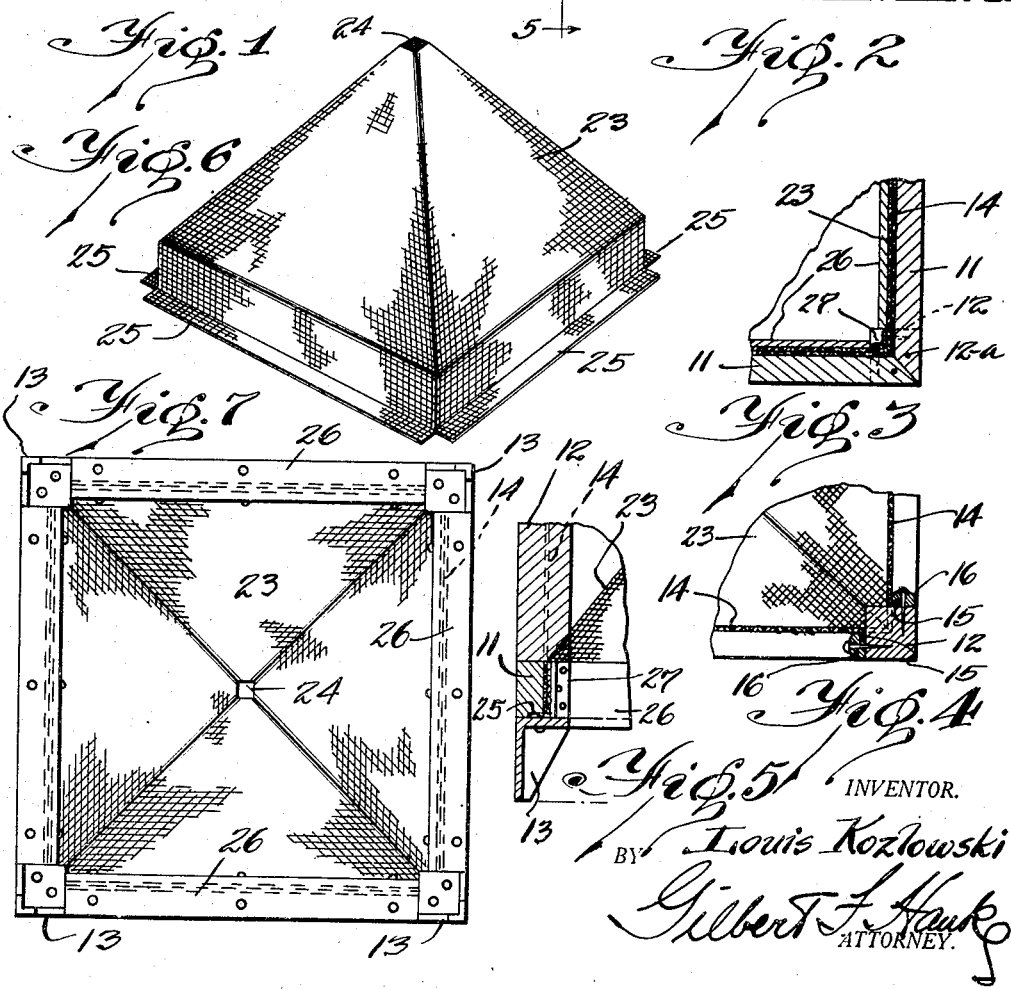
INVENTOR.
Louis Kozlowski
BY Gilbert F. Hawk
ATTORNEY.

Patented Sept. 15, 1931

1,823,365

UNITED STATES PATENT OFFICE

LOUIS KOZLOWSKI, OF HAMTRAMCK, MICHIGAN

INSECT TRAP

Application filed July 1, 1929. Serial No. 375,125.

This invention relates to insect traps, and more particularly to that type of trap, in which the insects may freely enter, but when once on the inside are unable to readily find any means for making their exit.

Various means have been proposed for catching insects and flies, many of which being planned to trap the insects. With most traps of this character, considerable difficulty is experienced in constructing the trap, because of the fact that all joints must be absolutely sealed to prevent the escape of the entrapped insects.

It is the object of my invention to decrease the manufacturing costs of traps of this character by providing a trap that can be very readily assembled with a minimum of labor.

A further object of my invention is to provide an improved construction for insect traps of this character in which all joints are absolutely sealed and maintained in such condition during the lifetime of the trap.

A still further object of my invention is to provide an insect trap of this character, that may be economically maintained in first class condition by so constructing the trap that various worn parts thereof can be readily and inexpensively replaced with new parts, thereby prolonging the useful life of the trap at a minimum of cost.

For a more detailed understanding of my invention, reference may be had to the accompanying drawings, which illustrate one form which my invention may assume, and in which:

Fig. 1 is a view in elevation of an insect trap constructed in accordance with my invention.

Fig. 2 is a vertical sectional view thereof.

Fig. 3 is a sectional view taken on the line 3—3 of Fig. 1.

Fig. 4 is a sectional view taken on the line 4—4 of Fig. 1.

Fig. 5 is a sectional view taken on the line 5—5 of Fig. 2.

Fig. 6 is a view in perspective of the inner pyramidal cage of wire mesh.

Fig. 7 is a bottom plan view of the insect

Fig. 7 is a bottom plan view of the insect trap, and showing the means for clamping the inner and outer cages to the frame structure of the outer cage.

My improved trap for flies or other insects is constructed of two spaced telescoping screen cages, between which the insects are trapped. The outer cage is constructed with a frame structure comprising the upper frame 10, the lower frame 11, and the vertical posts 12, which connect the upper and lower frames. Suitable legs 13 or other suitable supporting means are attached to the lower frame 11 for raising the main body portion of the trap off the floor or table, on which the trap rests. As shown on the accompanying drawings, the outer cage is preferably constructed with separate panels 14 of wire mesh, which may be secured to the four sides of the cage. These screen panels are preferably formed with the outwardly turned flanges 15 at the top and two sides thereof, and a molding strip 16 is fitted over these turned out flanges and nailed to the frame structure, as shown in Figures 2 and 4. The use of the molding strips permits the absolute sealing of the joints between the screen panels and the frame structure, and furthermore, will prevent the screen from becoming torn or broken at the point where it is joined to said frame structure.

A door or cover 17 is hinged to the upper frame 10, this cover being preferably constructed of a frame 18 and the central panel 19 of wire mesh, which is secured to the frame 18 by the molding strips 20. The upper frame 10 is provided with a jam 21, on which is laid a suitable pad 22 of felt, which serves as a seat for the cover. Thus, the joint between the cover and the upper frame is tightly closed when the cover is closed, thereby preventing the escape of the entrapped insects at this point. Any suitable latch 17a may be provided for locking the cover in the closed position.

The inner cage 23 is telescoped within the outer cage through the open bottom thereof. The inner cage, as shown in Fig. 6, is preferably pyramidal in shape. The apex of the cage is provided with an opening 24 and the lower portion thereof is shaped to provide a short vertical portion, which is adapted to just fit within the lower frame 11 of the outer cage. The extreme lower edge of the inner cage is provided with the outwardly extending flanges 25, which are arranged to seat in a suitable recessed portion of the lower frame. The panels 14 are provided with the depending extensions, that are also adapted to lie flush against the inner face of the lower frame. Strips 26 of angle iron are fastened to the lower frame by screws, nails or other suitable fastening devices, thereby clamping the panels 14 and the inner cage 23 tightly to the lower frame. These strips 26 do not extend the full width of the trap, (see Fig. 7) but the legs 13 are secured to each corner of the trap, the said legs and strips together clamping said screen elements to the lower frame entirely around the lower perimeter of the trap to close all joints at this point to prevent the escape of insects, when trapped between the inner and outer cages.

The lower frame members are preferably united together by the angles 27 (see Fig. 3) and nailed or otherwise secured to the vertical posts 12 as at 12a.

The bait for enticing the insects into the trap is preferably suspended within the trap. Any saccharine body, such as honey or other saccharine liquid may be utilized for bait. I preferably provide a U-shaped wire loop 28 on which an absorbent sleeve 29 is hung, the ends of said loop being inserted through the screen carried by the cover and bent over as at 30. It may thus be seen, that it is very easy to renew or change the bait at any time.

The flies or other insects, being attracted by the bait, enter the trap through the opening 24 in the inner cage at the apex thereof. This opening is relatively small and the insects will not readily find the opening again, and consequently are trapped within the said trap. The insects can be removed from the trap from time to time by raising the cover and dumping them out.

It may be noted, that the insects cannot escape from the trap at any of the joints, because of the construction which effectively seals all joints. Furthermore, the inner cage may be readily removed by unfastening the clamping strips 26 and the legs 13, thereby permitting the trap to be thoroughly cleaned very readily, and also permitting the ready replacement of worn or damaged parts.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:—

In an insect trap, a series of four vertical corner posts, a series of frame members connecting the corner posts at the top, a series of wood frame members connecting the corner posts at the bottom, a screen panel secured to the sides of the frame thus formed and extending across the inner face of the respective lower frame member, a pyramidal screen positioned within the frame and having an opening at its apex, the screen being provided with outturned flanges at the bottom fitting against the lower faces of the lower frame members and an angle iron member secured to each lower frame member and extending across the lower and inner faces of the respective frame members, the angle iron members extending upwardly into the pyramidal screen and securing the pyramidal screen and screen panels to the respective frame members.

In testimony whereof I have affixed my signature.

LOUIS KOZLOWSKI.